US009216759B2

(12) United States Patent
Kim

(10) Patent No.: US 9,216,759 B2
(45) Date of Patent: Dec. 22, 2015

(54) STEERING APPARATUS FOR VEHICLE

(71) Applicant: MANDO CORPORATION, Pyeongtaek-si, Gyeonggi-do (KR)

(72) Inventor: Ki Hwan Kim, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/308,253

(22) Filed: Jun. 18, 2014

(65) Prior Publication Data

US 2015/0130152 A1    May 14, 2015

(30) Foreign Application Priority Data

Nov. 8, 2013    (KR) .................. 10-2013-0135583

(51) Int. Cl.
*B62D 1/16* (2006.01)
*B62D 1/20* (2006.01)
*F16D 3/84* (2006.01)
*B60R 13/08* (2006.01)
*B60R 13/02* (2006.01)

(52) U.S. Cl.
CPC . *B62D 1/20* (2013.01); *B60R 13/02* (2013.01); *B60R 13/08* (2013.01); *B62D 1/16* (2013.01); *F16D 3/84* (2013.01); *F16D 3/843* (2013.01)

(58) Field of Classification Search
CPC ............ B62D 1/16; B62D 1/20; B60R 13/02; B60R 13/08; F16D 3/84; F16D 3/843
See application file for complete search history.

(56) References Cited

U.S. PATENT DOCUMENTS

| 4,267,743 | A  | * | 5/1981  | Tanaka ...................... 74/473.22 |
| 4,282,722 | A  | * | 8/1981  | Orain .......................... 464/175 |
| 4,961,480 | A  | * | 10/1990 | Weiler et al. ............... 188/73.44 |
| 5,695,202 | A  | * | 12/1997 | Cartwright et al. ........... 277/636 |
| 6,056,297 | A  | * | 5/2000  | Harkrader et al. ............ 277/634 |
| 6,328,315 | B1 | * | 12/2001 | Hebenstreit ................... 277/634 |
| 7,272,989 | B2 | * | 9/2007  | Schuh .............................. 74/492 |
| 7,484,760 | B2 | * | 2/2009  | Suzuki et al. ................. 280/779 |
| 7,534,172 | B2 | * | 5/2009  | Wormsbaecher ............. 464/175 |
| 8,469,399 | B2 | * | 6/2013  | Allen ............................. 280/779 |
| 8,888,132 | B2 | * | 11/2014 | Allen ............................. 280/779 |
| 2004/0256849 | A1 | * | 12/2004 | Suzuki et al. ................. 280/779 |
| 2014/0033855 | A1 | * | 2/2014  | Allen .............................. 74/492 |
| 2014/0099049 | A1 | * | 4/2014  | Allen ............................ 384/130 |
| 2014/0206464 | A1 | * | 7/2014  | Ketchel et al. ............... 464/170 |
| 2015/0054231 | A1 | * | 2/2015  | Lichtenberg .................. 277/636 |
| 2015/0166101 | A1 | * | 6/2015  | Ross ............................... 701/41 |

* cited by examiner

*Primary Examiner* — Faye M Fleming
*Assistant Examiner* — Barry Gooden, Jr.
(74) *Attorney, Agent, or Firm* — McDermott Will & Emery LLP

(57) ABSTRACT

The present invention relates to a steering apparatus for a vehicle, and an embodiment of the present invention can improve a repair efficiency of a vehicle due to easy detachment between a dust cap and an inner cover.

10 Claims, 4 Drawing Sheets

STEERING APPARATUS FOR VEHICLE

CROSS-REFERENCE TO RELATED APPLICATION

This application claims priority from and the benefit under 35 U.S.C. §119(a) of Korean Patent Application No. 10-2013-0135583, filed on Nov. 8, 2013, which is hereby incorporated by reference for all purposes as if fully set forth herein.

BACKGROUND OF THE INVENTION

1. Field of the Invention

The present invention relates to a steering apparatus for a vehicle, and more particularly to, a steering apparatus for a vehicle in which a dust cap and an inner cover are easily attached/detached to/from each other so as to improve a repair efficiency of the vehicle.

2. Description of the Prior Art

FIG. 1 is a schematic view illustrating a steering apparatus for a vehicle to which a dust cover is mounted, according to the related art.

As illustrated in FIG. 1, in the steering apparatus for a vehicle according to the related art, a lower end of a steering shaft is connected to a gear box 101, and generally, the steering shaft is connected to the gear box 101 while being sloped in a predetermined angle due to surrounding situations. Therefore, the steering apparatus for a vehicle includes an intermediate shaft 107 configured by a universal joint, a tube 103, and a shaft 105, in order to satisfy such conditions.

One side of the intermediate shaft 107 constituting the steering shaft is connected to an upper steering shaft 111 connected to a steering wheel 109, and the other side thereof is connected to the gear box 101, so that a rotational force generated by the steering wheel 109 is transferred to a wheel through the gear box 101.

A steering column 113 includes an outer tube 115, an inner tube 117, and a mounting bracket 119. The outer tube 115 is formed at a side of the steering wheel 109, and the inner tube 117, having a diameter smaller than that of the outer tube 115 to be inserted into the outer tube 115 when an impact is applied, is provided inside of the outer tube 115.

The outer tube 115 and the inner tube 117 correspond to hollow tubes, so that the steering shaft is smoothly rotated.

Meanwhile, a dust cover 123 is used for blocking noise, etc. introduced to an indoor side through an engine room while being fixed to a dash panel 121, and the dust cover 123 includes an upper dust cover 125 mounted to an indoor side with respect to the dash panel 121 and a lower dust cover 127 mounted to an engine room side with respect to the dash panel 121.

Meanwhile, the upper dust cover 125 and the lower dust cover are coupled to each other by a fixing member such as a bolt, etc.. When a repair operation of the gear box 101, etc. is requested, the upper dust cover 125 and the lower dust cover 127 should be necessarily separated from each other. In this case, there is a problem in that, as a time period consumed for a repair operation increases due to a time period consumed for such a separation operation and the number of times of detachment increases, a coupling portion of the fixing member is worn, so that noise is generated due to an interval between the upper dust cover and the lower dust cover.

SUMMARY OF THE INVENTION

The present invention has been conceived in order to solve the aforementioned problems, and an aspect of the present invention is to provide a steering apparatus for a vehicle of which repair efficiency is improved due to easy detachment between a dust cap and an inner cover.

Further, another aspect of the present invention is to provide a steering apparatus of a vehicle in which a clip member can be prevented from being damaged when the inner cover and the dust cap are separated from each other, by moving a catching protrusion portion formed at an extension leg portion of the clip member, along one side surface slantingly formed at a communication groove of the dust cap.

The aspects of the present invention are not limited thereto, and other unmentioned aspects can be understood from the following descriptions by those skilled in the art.

In accordance with an embodiment, a steering apparatus for a vehicle is provided. The steering apparatus includes: a dust cap through which a steering shaft passes, one side thereof being coupled to a rack housing, the dust cap having a coupling flange portion formed on an outer peripheral surface thereof; an outer cover of which one side is coupled to the coupling flange portion of the dust cap; an inner cover of which an inner peripheral surface is closely coupled to the other side of the outer cover and through which the steering shaft passes; and a clip member of which one side is coupled to a coupling support portion formed at an inner side of the inner cover and the other side is coupled to the other side of dust cap.

An embodiment of the present invention can improve a repair efficiency of a vehicle since a dust cap and an inner cover are easily detached from each other.

Further, an embodiment of the present invention can prevent a clip member from being damaged when the inner cover and the dust cap are separated from each other, by moving a catching protrusion portion formed at an extension leg portion of the clip member, along one side surface slantingly formed at a communication groove of the dust cap.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, It should be appreciated that when one component is described as being "connected," "coupled" or "joined" to another component, a third component may be "connected," "coupled," and "joined" between the first and second components, although the first component may be directly connected, coupled or joined to the second component.

Figure 1:
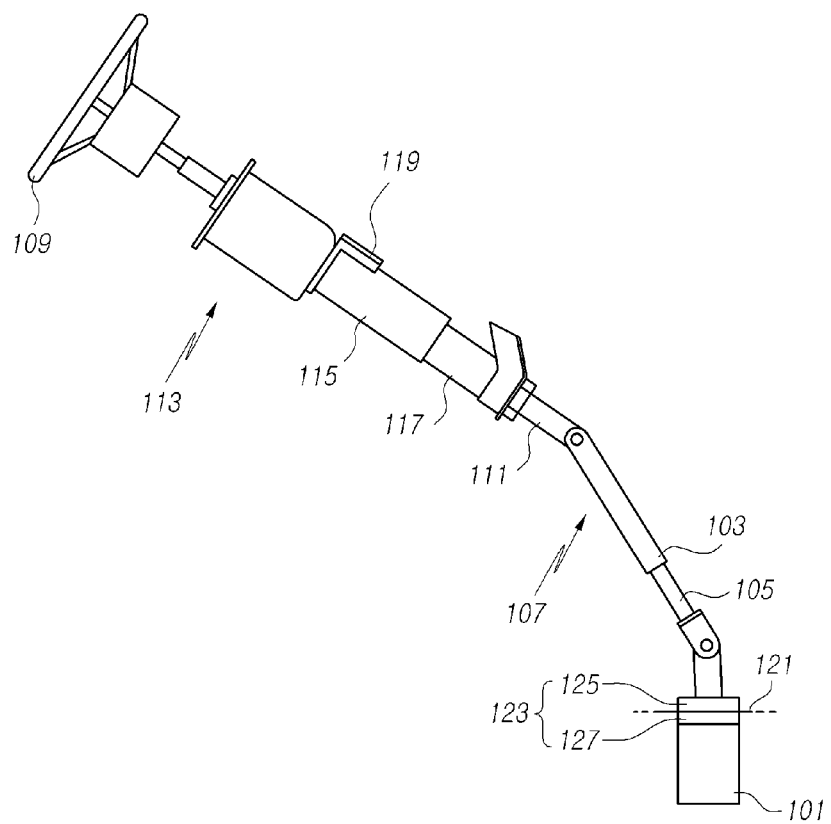
FIG. 1 is a schematic view illustrating a steering apparatus for a vehicle to which a dust cover is mounted, according to the related art.
Figure 2:
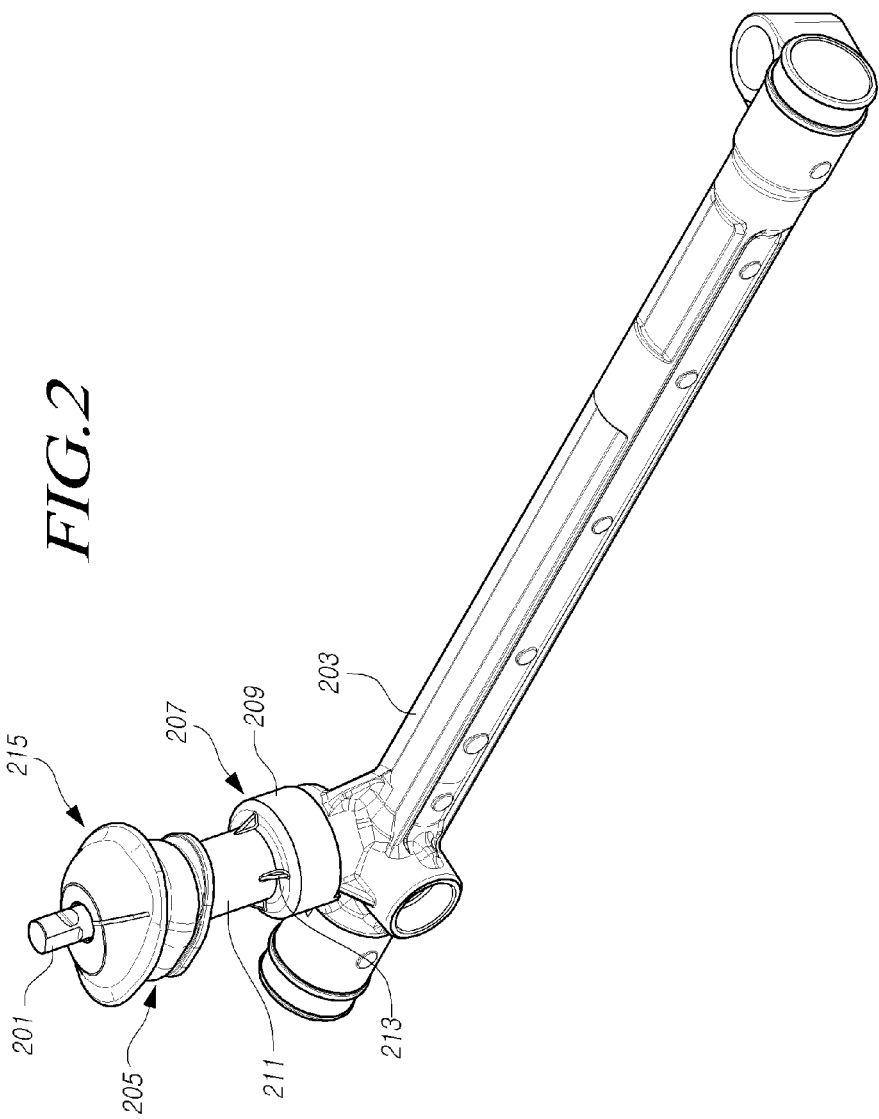
FIG. 2 is a perspective view illustrating a part of a steering apparatus of a vehicle according to an embodiment of the present invention.
Figure 3:
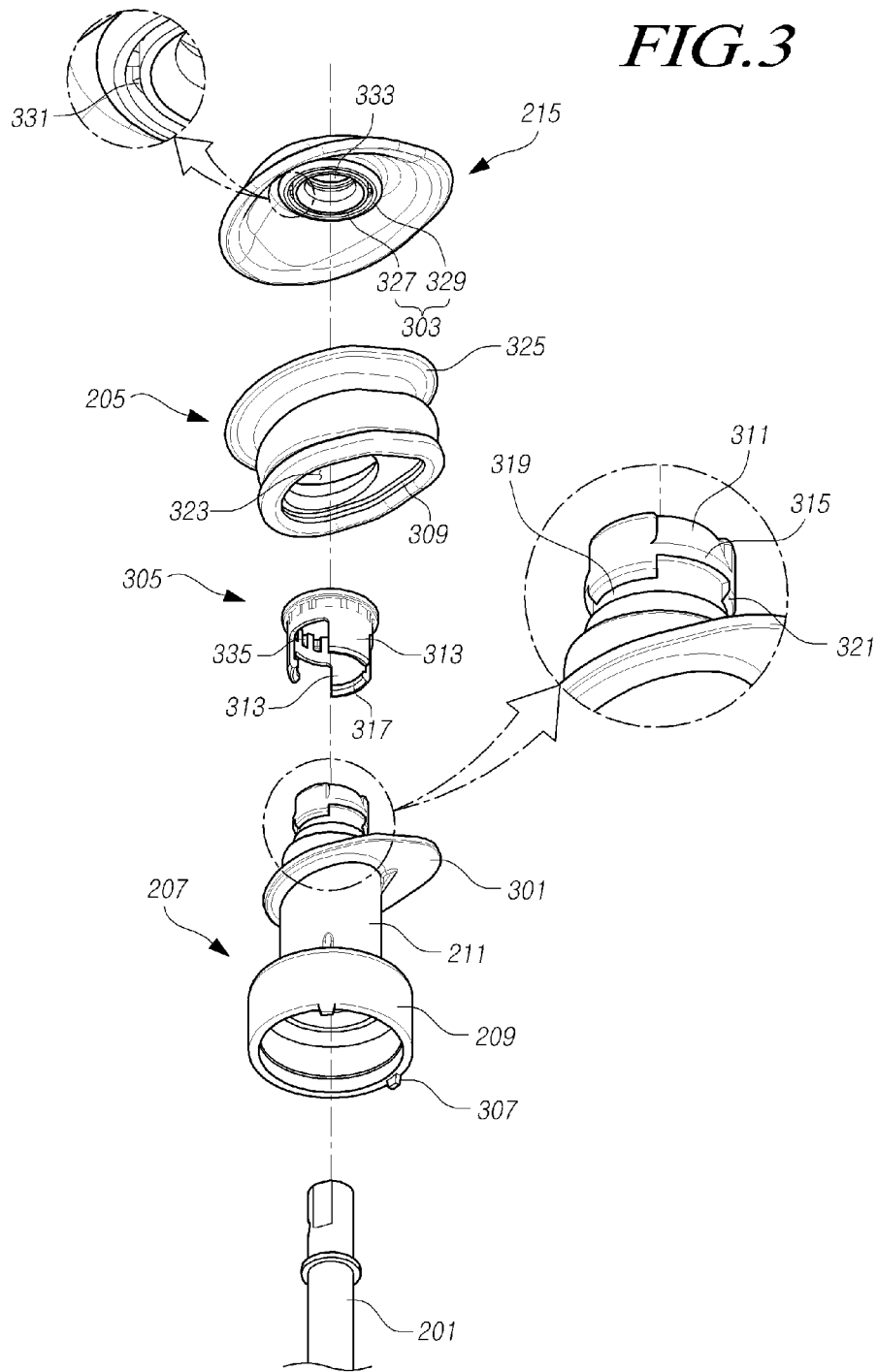
FIG. 3 is an exploded perspective view illustrating a part of FIG. 2.
Figure 4:
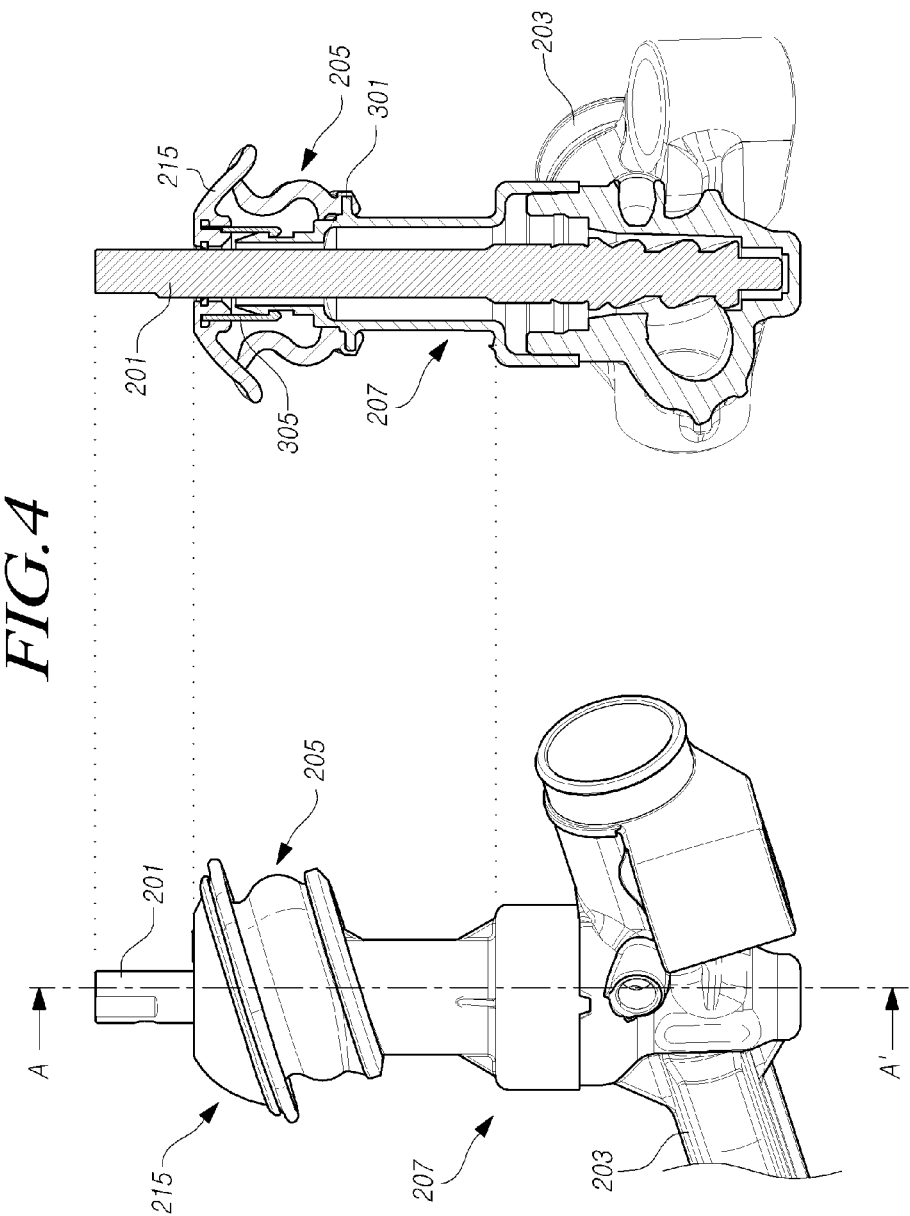
FIG. 4 is a sectional view illustrating a part of FIG. 2, taken along line A-A.

FIG. 2 is a perspective view illustrating a part of a steering apparatus of a vehicle according to an embodiment of the present invention. FIG. 3 is an exploded perspective view illustrating a part of FIG. 2. FIG. 4 is a sectional view illustrating a part of FIG. 2, taken along line A-A.

Referring to FIGS. 1 to 4, a steering apparatus of a vehicle according to an embodiment of the present invention includes a dust cap 207 through which a steering shaft 201 passes, one side of the dust cap 207 being coupled to a rack housing 203, and the dust cap 207 having a coupling flange portion 301 formed on an outer peripheral surface thereof; an outer cover 205 of which one side is coupled to the coupling flange portion 301 of the dust cap 207; an inner cover 215 of which an inner peripheral surface is closely coupled to the other side of the outer cover 205 and through which the steering shaft 201 passes; and a clip member 305 of which one side is coupled to a coupling support portion 303 formed at an inner side of the inner cover 215 and of which the other side is coupled to the other side of the dust cap 207.

The steering shaft 201 is connected to the steering wheel 109, and a pinion gear is formed at an end portion of the steering shaft 201. Such a steering shaft 201 is engaged with a rack bar (not illustrated) provided at an inner side of the rack housing 203 so that a driver steers a wheel by transferring a steering force for manipulating the steering wheel 109, through the steering shaft 201, to the rack bar.

One side of the dust cap 207 is coupled to the rack housing 203, and the dust cap 207 has a shape of a hollow tube, and includes a large diameter portion 209 and a small diameter portion 211 extending from the large diameter portion 209.

Meanwhile, support plates 213 circumferentially spaced apart from each other are formed on an outer peripheral surface on which the large diameter portion 209 and the small diameter portion 211 are in contact with each other, and insertion protrusions 307 further protruding in a lengthwise direction are formed at a lower peripheral edge of the large diameter portion 209, so that such insertion protrusions 307 are inserted into catching grooves (not illustrated) formed in the rack housing 203.

Further, a coupling flange portion 301 is formed on an outer peripheral surface of the dust cap 207 (in more detail, an outer peripheral surface of the small diameter portion 211). Such a coupling flange portion 301 is inserted into a coupling flange portion insertion groove 309 sunken at an inner peripheral surface of one side of the outer cover 205 to have a shape of a groove, so that the dust cap 207 and the outer cover 205 are closely coupled to each other.

Meanwhile, a guide slot groove 311 is axially formed on an outer peripheral surface of the other side of the dust cap 207, and is formed to guide movement of an extending leg portion 313 of the clip member 305.

Further, a catching step portion 315 protrudes from the guide slot groove 311, and a catching protrusion portion 317 protruding from an inner peripheral surface of an end of the extension leg portion 313 of the clip member 305 is caught and supported by such a catching step portion 315.

Meanwhile, the guide slot groove 311 may be sloped such that an outer diameter thereof increases toward the catching step portion 315. Since the guide slot groove 311 is sloped in this way, when the extension leg portion 313 of the clip member 305 moves along the guide slot groove 311, the diameter of the extension leg portion 313 is enlarged to the outside and is then reduced to the inside by an elastic restoration force while passing the catching step portion 315, and the catching protrusion portion 317 is supported by the catching step portion 315, so that the extension leg portion 313 can be firmly fixed to the catching step portion 315.

Further, a communication groove 319 circumferentially communicating with the guide slot groove 311 is formed on an outer peripheral surface of the other side of the dust cap 207, and such a communication groove 319 guides circumferential movement of the catching protrusion portion 317.

Further, one side surface 321 at an inner cover 215 side of such a communication groove 319 constitutes a sloped surface. Since the communication grove 319 is formed in this way, in a case where the clip member 305 is separated from the dust cap 207, when the catching protrusion portion 317 of the extension leg portion 313 moves to the sloped one side surface 321 of the communication groove 319 while rotating the clip member 305 and the clip member 305 is then extracted, the catching protrusion portion 317 can be easily disjoined along the sloped one side surface 321 of the communication groove 319.

Next, one side of the outer cover 205 is coupled to the coupling flange portion 301 of the dust cap 207. That is, as described above, the coupling flange portion 301 is inserted into the coupling flange portion insertion groove 309 formed on an inner peripheral surface of the one side of the outer cover 205, so that the outer cover 205 and the dust cap 207 are coupled to each other.

Meanwhile, a through-hole 323 is formed at an inner side of the outer cover 205 such that the clip member 305 passes through the through-hole 323, and an attachment portion 325 having an outer diameter which increases toward a direction in which the inner cover 215 is coupled is formed at the other side of the outer cover 205.

Next, the inner cover 215 has a structure in which an inner peripheral surface thereof is closely coupled to the other side of the outer cover 205, the steering shaft 201 passes through the inner cover 215, and an inner diameter thereof gradually increases toward a direction in which the outer cover 205 is coupled. Further, when the outer cover 205 is led in the inner cover 215, the attachment portion 325 of the outer cover 205 is closely attached and coupled to an inner peripheral surface of the inner cover 215.

Meanwhile, a coupling support portion is formed at an inner side of the inner cover 215, and such a coupling support portion may include an inner support portion 327 formed at an edge of the through-hole 333 through which the steering shaft 201 passes and extending in a direction in which the outer cover 205 is coupled; an outer support portion formed to be spaced apart from the inner support portion 327 toward a radial direction; and a coupling protrusion 331 formed between the inner support portion 327 and the outer support portion 329.

Here, both the inner support portion 327 and the outer support portion 329 may have a cylindrical shape, and the coupling protrusion 331 is inserted into a coupling protrusion insertion groove 335 formed on an inner peripheral surface of one side of the clip member 305.

Next, the one side of the clip member 305 is coupled to the coupling support portion 303 formed at an inner side of the inner cover 215 and the other side of the clip member 305 is coupled to the other side of the dust cap 207. At this time, the clip member 305 may have a hollow cylindrical shape. Further, as described above, the extension leg portion 313 extending toward the other side of the dust cap 207 is formed in the clip member 305, and FIGS illustrate an example where three extension leg portions 313 are spaced in a circumferential direction and formed with the same interval.

Meanwhile, the catching protrusion portion 317 protruding toward the inside is formed on an inner peripheral surface of an end of the extension leg portion 313, and the coupling protrusion insertion groove 335 opened toward the coupling support portion 303 is formed on an inner surface of the one side of the clip member 305. Therefore, the coupling protrusion 331 formed in the coupling support portion 303 of the inner cover 215 is inserted into and coupled to the coupling protrusion insertion groove 335 formed in the clip member 305, so that the clip member 305 is coupled to the inner cover 215.

A process of attaching/detaching a dust cap and an inner cover of a steering apparatus for a vehicle according to an embodiment of the present invention will be described the accompanying drawings.

First, when the inner cover 215 to which the clip member 305 is coupled is coupled to the dust cap 207 to which the outer cover 205 is coupled, the inner cover 215 is pressed toward the outer cover 205 while the extension leg portion 313 of the clip member 305 is matched with the guide slot groove 311 of the dust cap 207. At this time, the extension leg portion 313 of the clip member 305 moves along the guide slot groove 311 of the dust cap 207, and the catching protrusion portion 317 of the extension leg portion 313 is caught by the catching step portion 315 of the guide slot groove 311, so that the dust cap 207 and the inner cover 215 are coupled to each other.

In contrast, when the inner cover 215 is separated from the dust cap 207, the inner cover 215 is further pressed such that the catching protrusion portion 317 of the extension leg portion 313 moves to the communication groove 319, the inner cover 215 is then rotated such that the catching protrusion portion 317 moves to the sloped one side surface 321 of the communication groove 319, and the inner cover 215 is pulled. As a result, the inner cover 215 is separated.

As described above, an embodiment of the present invention can improve a repair efficiency of a vehicle since a dust cap and an inner cover are easily detached from each other.

Further, an embodiment of the present invention can prevent a clip member from being damaged when the inner cover and the dust cap are separated from each other, by moving a catching protrusion portion formed at an extending leg portion of the clip member, along one side surface slantingly formed at a communication groove of the dust cap.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

DESCRIPTION OF REFERENCE NUMERALS

205: Outer cover
207: Dust cap
215: Inner cover
305: Clip member

What is claimed is:

1. A steering apparatus for a vehicle, the steering apparatus comprising:
   a dust cap through which a steering shaft passes, one side thereof being coupled to a rack housing, the dust cap having a coupling flange portion formed on an outer peripheral surface thereof;
   an outer cover of which one side is coupled to the coupling flange portion of the dust cap;
   an inner cover of which an inner peripheral surface is closely coupled to an other side of the outer cover and through which the steering shaft passes; and
   a clip member of which one side is coupled to a coupling support portion formed at an inner side of the inner cover and an other side is coupled to an other side of dust cap.

2. The steering apparatus of claim 1, wherein a coupling flange portion insertion groove which the coupling flange portion is inserted into and coupled to is sunken on an inner peripheral surface of the one side of the outer cover.

3. The steering apparatus of claim 1, wherein the clip member has an extension leg portion extending toward the other side of the dust cap.

4. The steering apparatus of claim 3, wherein a coupling protrusion insertion groove opened toward the coupling support portion is formed on an inner peripheral surface of the one side of the clip member such that a coupling protrusion formed in the coupling support portion of the inner cover is inserted into and coupled to the coupling protrusion insertion groove.

5. The steering apparatus of claim 3, wherein a guide slot groove configured to guide movement of the extension leg portion is formed the outer peripheral surface of the dust cap.

6. The steering apparatus of claim 5, wherein a catching step portion protrudes from the guide slot groove.

7. The steering apparatus of claim 6, wherein a catching protrusion portion protruding toward an inner side is formed on an inner peripheral surface of an end of the extension leg portion to be caught by the catching step portion.

8. The steering apparatus of claim 7, wherein the guide slot groove is slantingly formed such that an outer diameter thereof increases toward the catching step portion.

9. The steering apparatus of claim 8, wherein a communication groove communicating with the guide slot groove in a circumferential direction is formed on the outer peripheral surface of the other side of the dust cap to guide circumferential movement of the catching protrusion portion.

10. The steering apparatus of claim 9, wherein one side surface of the communication groove constitutes a sloped surface.

* * * * *